Figure 1:
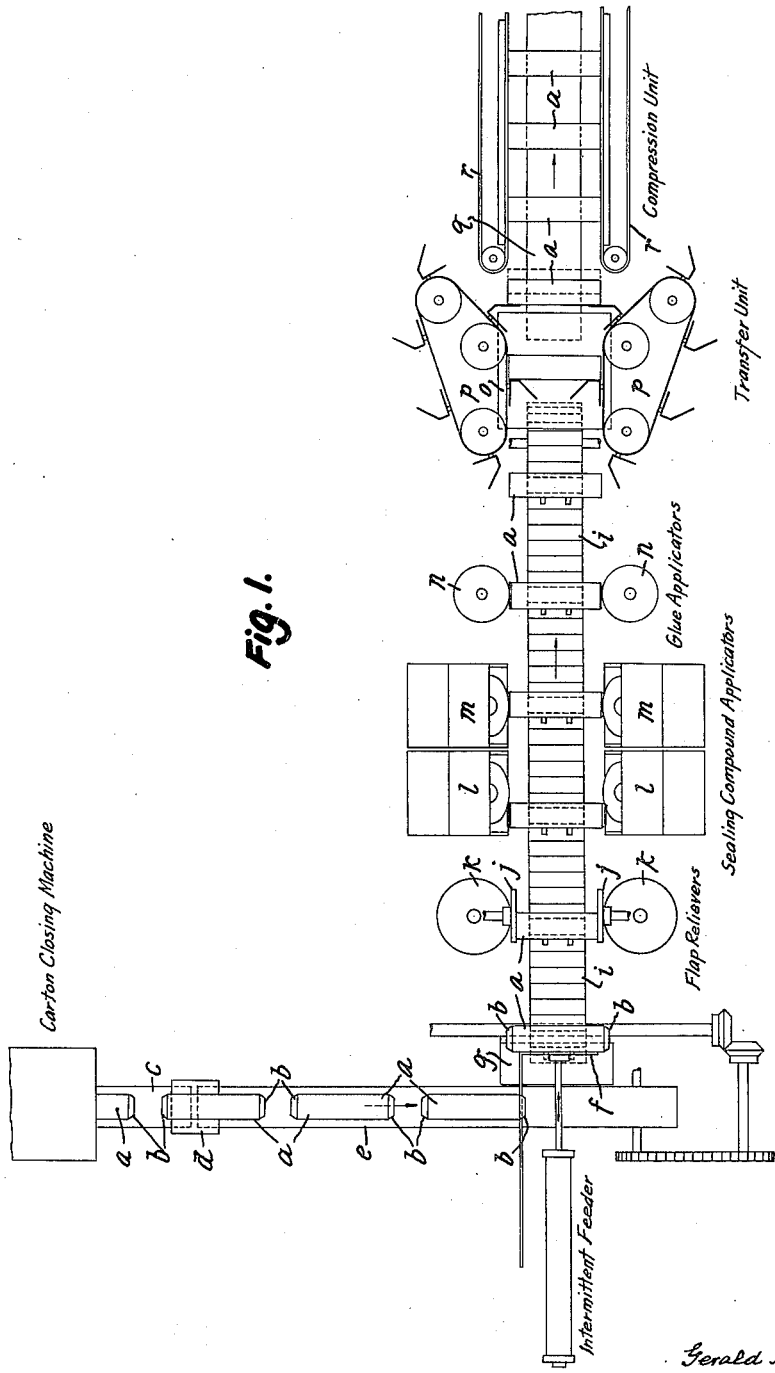

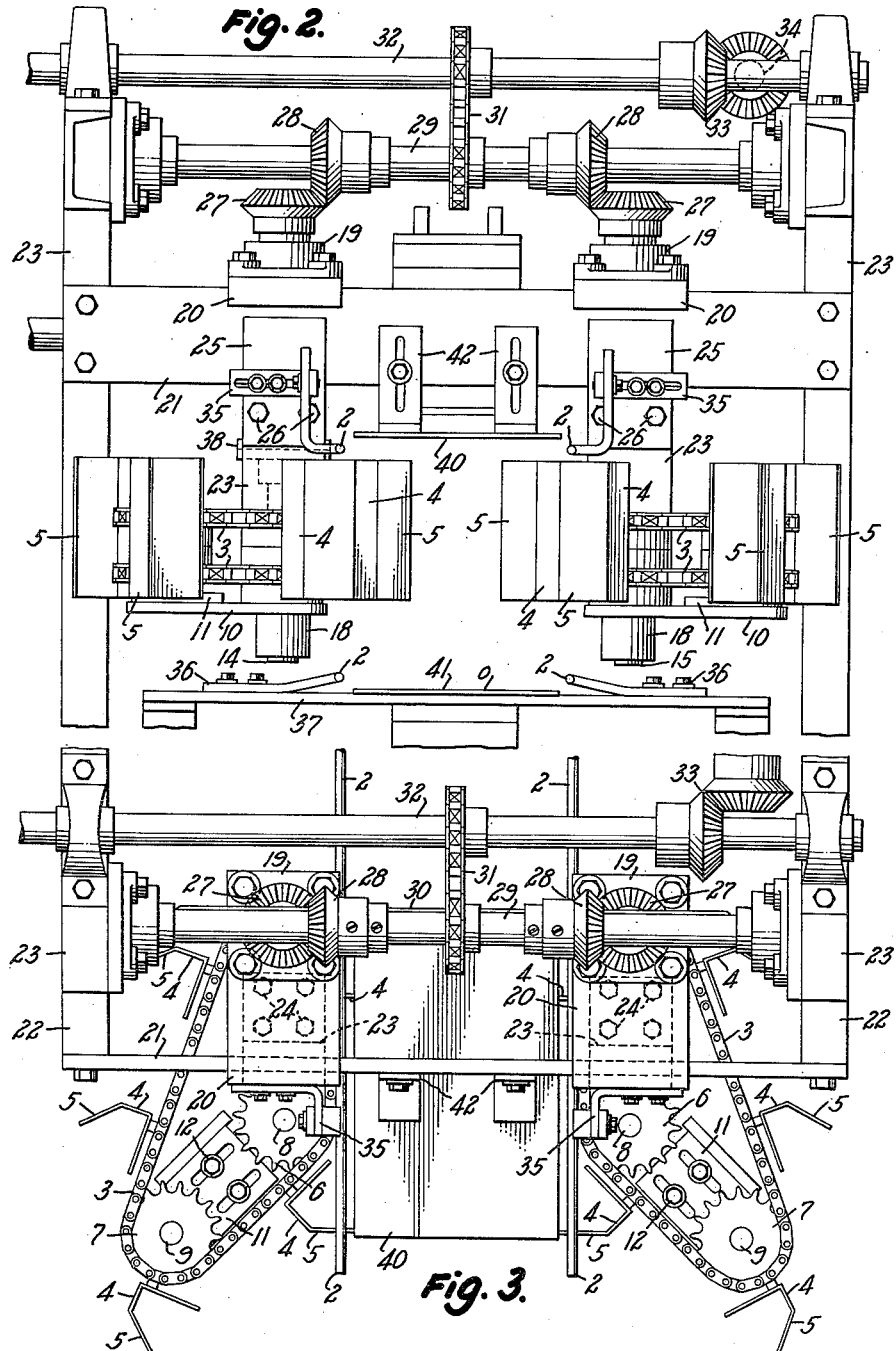

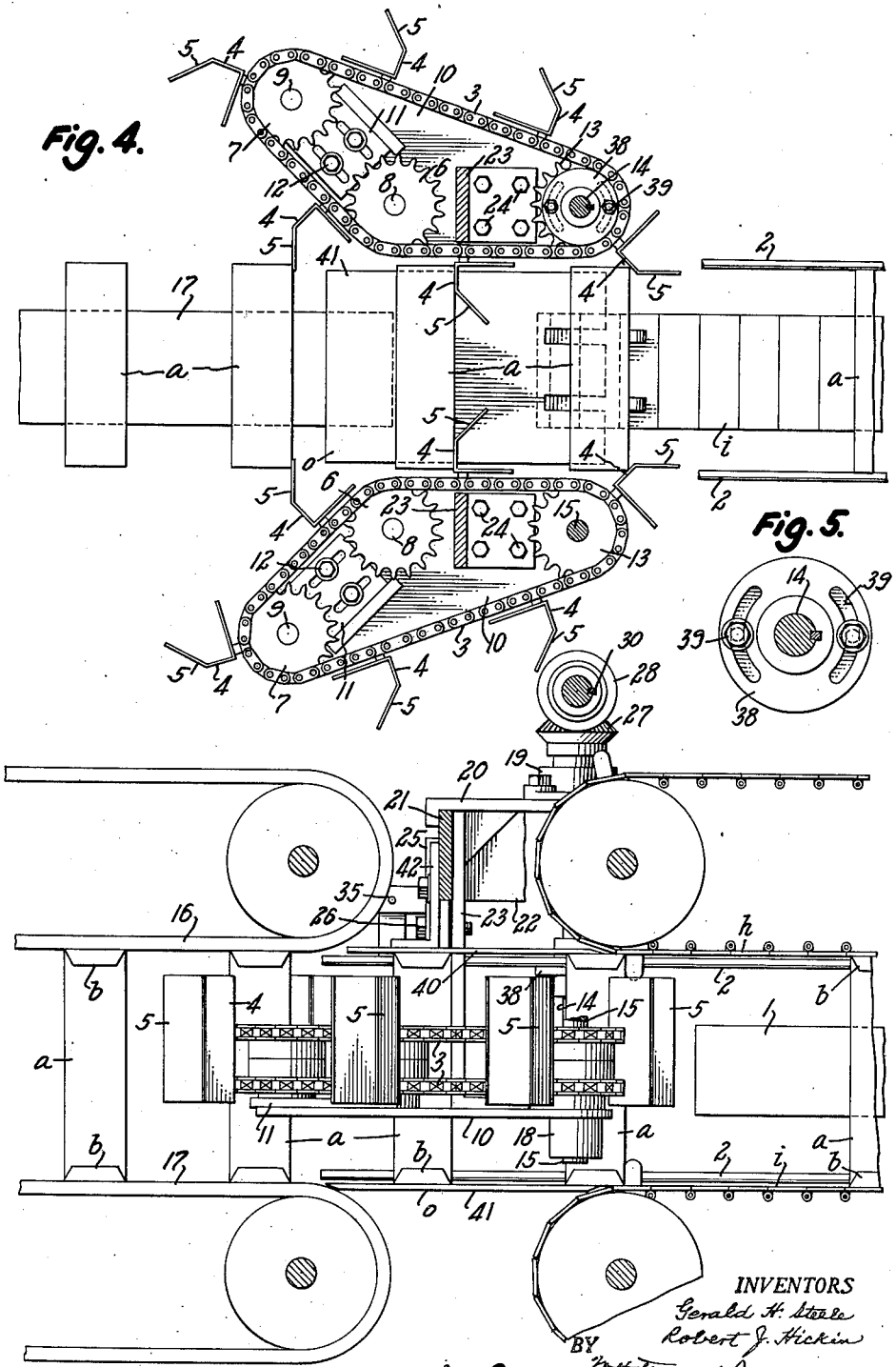

June 5, 1962  G. H. STEELE ET AL  3,037,609
ARTICLE HANDLING MECHANISM
Original Filed Nov. 24, 1959  4 Sheets-Sheet 4
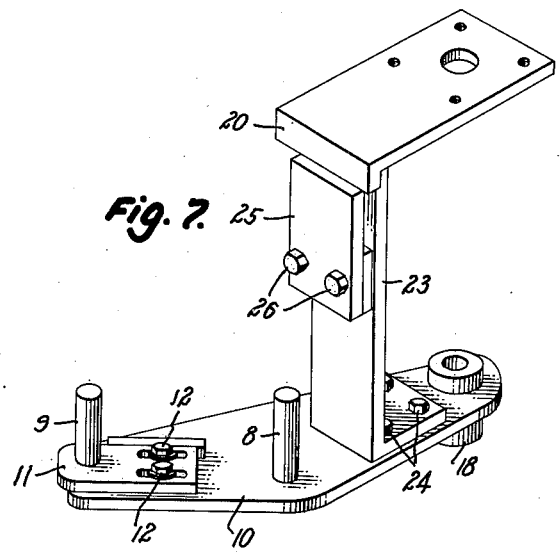
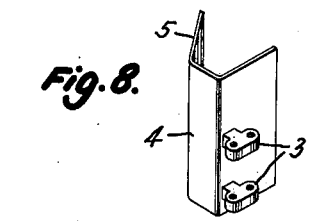
INVENTORS
Gerald H. Steele
Robert J. Hickin
BY
W. H. Finckel Jr.
Atty.

United States Patent Office 3,037,609
Patented June 5, 1962

3,037,609
ARTICLE HANDLING MECHANISM
Gerald H. Steele, Leroy, and Robert J. Hickin, Seville, Ohio, assignors to Packaging Corporation of America, Rittman, Ohio, a corporation of Delaware
Original application Nov. 24, 1959, Ser. No. 855,074. Divided and this application May 11, 1960, Ser. No. 28,325
11 Claims. (Cl. 198—34)

This application is a division of applicants' copending application for patent for Carton Sealing Apparatus, filed November 24, 1959, Serial No. 855,074, now abandoned in favor of applicants' continuation-in-part application of the same title filed December 1, 1960, Serial No. 73,147.

The herein disclosed invention relates to article handling mechanism, and it has special reference to mechanism for handling paperboard cartons during their transfer from one machine to another during a packaging operation, particularly when the speed of linear travel, and the relative linear spacing, of the cartons in such machines is different and the handling of the cartons must be performed without shock and in continuous sequence.

One object of the invention is, therefore, to provide mechanism which will transfer articles, particularly those which, during such transfer, must be handled gently, though rapidly, such as paperboard cartons, from one machine or stage to another as, for example, in packaging apparatus, from the carton filling, closing and sealing or gluing machine to the compresison unit, as disclosed in the aforesaid application of which this application is a division.

Another object of the invention is to provide article handling mechanism which will be capable of effecting transfer of articles from one handling stage to another at a speed of linear travel which varies between such stages.

A further object is to provide article handling mechanism which will effect transfer of articles from one handling stage in which they are arranged and travel in one sequential relative linear spacing to another handling stage in which they travel in a different sequential relative linear spacing.

Still another object is to provide article handling mechanism the elements of which are adjustable to accommodate the mechanism to articles of various dimensions.

Another object is to provide article handling mechanism which may be adjusted for operation at a variety of speeds without disturbing the normal speed of operation of the machines with which it is associated and between which it effects transfer of the articles being handled.

With these and other objects and advantages in view, as will appear hereinafter, the invention comprises article handling mechanism in the nature of a unit for effecting transfer of articles from one machine, or handling stage, to another, including a pair of similar transfer elements, such as chains or belts, flanking the path of normal travel of the articles to be transferred, each of said transfer elements carrying a plurality of linearly spaced article engaging members or finger plates adapted to engage articles in a successively fed series of same, said transfer elements each having an article transferring pass including a portion in substantial parallelism with the path of feed of the articles thereto and thereby, and a portion laterally divergent from such path, means for imparting synchronous linear travel to said pair of transfer elements to effect simultaneous engagement of their respective successively advancing pairs of article engaging members or finger plates with successively advancing articles of the fed series during travel of said transfer elements in parallelism and simultaneous retraction of said article engaging members or finger plates from the articles at the termini of their laterally divergent travel; and the invention comprises, also, means for respectively adjusting the two transfer elements to insure transverse alignment of their article engaging members or finger plates, means for effecting relative lateral adjustment of the pair of transfer elements to accommodate the mechanism to articles of various lateral dimensions, and means for varying the speed of linear travel of such transfer elements, all as will be explained hereinafter more fully and finally claimed.

In the accompanying drawings illustrating the invention, in the several figures of which like parts are similarly designated, FIG. 1 is a schematic plan view showing apparatus of the type with which the transfer mechanism of the invention may be associated, and showing it so associated; the apparatus shown being particularly adapted for operation upon cartons and embodying mechanisms disclosed in the copending application hereinbefore referred to as illustrative, FIG. 2 is a fragmentary end elevation of the mechanism of the invention, including one preferred form of drive means therefor, FIG. 3 is a top plan view of the parts shown in FIG. 2, FIG. 4 is a sectional top plan view of the mechanism of the invention, and illustrating the advancing transfer of sealed cartons from the conveyor of a carton sealing machine to the conveyor of a compression unit, FIG. 5 is an enlarged sectional bottom view of the shaft adjusting means for a drive shaft of the mechanism of the invention, FIG. 6 is a sectional side elevation of the parts shown in FIG. 4, and including the frame mounting means of the mechanism of the invention, FIG. 7 is a perspective view of the left-hand mounting plate of the mechanism of the invention with its mounting bracket attached, and FIG. 8 is a perspective view of one of the article engaging members or finger plates of the transfer elements or chains.

For a full understanding of one representative use of the invention, reference is made to the embodiment of carton sealing apparatus shown in FIG. 1, in which the mechanism of the invention is embodied as a transfer unit for transferring sealed cartons primarily of the Van Buren ear type from the sealing apparatus to a compression unit, and in which the filled cartons $a$ with their end closure flaps preferably closed and glue-sealed, but with the Van Buren ears $b$ freely offstanding, are fed from the carton closing machine upon a lugged link belt or other appropriate conveyor $c$ edgewise, and in uniformly spaced relation, over a dead plate $d$ and onto the conveyor belt $e$ of the sealing apparatus from which they are intermittently fed by the appropriately timed reciprocation of a pusher plate $f$ over a dead plate $g$ and between constantly traveling upper and lower lugged link conveyor belts $h$ and $i$, respectively, of a sealing apparatus, this intermittent feed, and the spacing of the lugs on the conveyor belts $h$ and $i$, serving to advance the cartons in a direction at right angles to their feed by the conveyor belt $e$, in other words broadside to their direction of travel, in predetermined relatively widely spaced relation, through the sealing apparatus past pairs of flap score relieving rollers j and k, upper and lower sealing compound applying mechanisms l and m, respectively, and glue applicator mechanisms n, whereafter they are moved by the conveyors h and i onto a dead plate o whereon they are picked up by the article engaging members or finger plates of the paired transfer elements p of the article handling mechanism or transfer unit of the invention and discharged from the sealing apparatus, in more closely spaced arrangement and with the Van Buren ears b of their end flaps caulked with the sealing compound and glue-adhered to their adjacent walls, onto the conveyor belt q of a compression unit r through which they pass in such predetermined elapsed time as will serve to permit the glue to set.

Having reference to FIGS. 2 to 8, it will be seen that when articles, such as the cartons shown (FIGS. 4 and 6), are advanced by the conveyor belts h and i between the guides 1 to the discharge end of the sealing apparatus, they will be engaged and further guided by rods 2 onto the dead plate o in the zone of operation of the elements p of the handling mechanism or transfer unit of the invention.

Each element p of the transfer unit preferably comprises a pair of vertically spaced, horizontally travelling, chains 3, see particularly FIG. 4, to which are attached linearly spaced article engaging members, preferably in the form of vertically arranged wing-like finger plates, each of which has two article-contacting faces 4 and 5 relatively disposed at a predetermined angle (say 45°, as shown) preferably equal to the angle of divergence of the chains 3 as hereinafter referred to. The chains 3 pass around idler sprockets 6 and 7 having their shafts 8 and 9 stepped, respectively, in a mounting or base plate 10 and in an adjustable chain tensioning slide 11 mounted on the base plate 10 and secured in adjustment by cap screws 12, and around drive sprockets 13 carried by drive shafts 14 and 15. It will be noted that these shafts 14 and 15 of the drive sprockets 13, and the shafts 8 of the idler sprockets 6, as well as the chain-carrying peripheries of these sprockets, are so related that the effective article-adjacent passes of the chains 3 are longitudinally parallel to their direction of travel and to each other, but that the shafts 8 and 9 of the idler sprockets 6 and 7, and the chain-carrying peripheries of these sprockets, are so disposed that the article-adjacent passes of the chains between these sprockets are at a predetermined angle of divergence (say 45°, as shown) to the direction of travel of the articles. By this arrangement, as will be apparent from FIGS. 3 and 4, the faces 4 of the article engaging members or finger plates will be effective to advance the cartons with and between the parallel passes of the chains 3 and the faces 5 of such article engaging members or finger plates, which, as stated, are disposed at an angle to the faces 4 preferably equal to said angle of divergence, will be similarly effective between the divergent passes of these chains, the transition from parallel to divergent travel of the chains causing the finger plates to push the articles by a somewhat rolling contact of the angles of junction of the faces 4 and 5 with the articles.

It will be noted that the effective feeding spacing of the article engaging members or finger plates along the chains 3 is less than that of the spacing of the lugged links of the conveyor belts h and i, and hence the linear travel of these chains is so gauged that an opposite pair of the article engaging members or finger plates will be in position to pick up and advance an article as soon as it is delivered by the belts h and i to the dead plate o, substantially as indicated in FIG. 4.

The transfer unit will successively deliver the articles in uniform, spaced arrangement to the belts (q) 16 and 17 (FIG. 6) of the compression unit r, and these belts may be either of plain friction surface type, as shown, or of lugged form.

With reference to FIGS. 2 and 3, it will be seen that the lower ends of the drive shafts 14 and 15 are engaged by and preferably vertically slidable in bearings 18 and the upper ends of these shafts pass through locating bearings 19 carried by clamp members 20 relatively laterally adjustable on a transverse beam 21 secured to the ends of arms 22 of a main machine frame 23. The two clamp members 20 suspend the base plates 10 and their respectively carried two elements p of the transfer unit by brackets 23 attached to them as by welding and to the base plates by cap screws 24, and clamping of the members 20 on the beam 21 is effected by plates 25 bolted to these brackets 23 and secured in frictional clamping engagement with the beam 21 by bolts 26 (FIGS. 2, 3, 4 and 7).

The drive shafts 14 and 15 have affixed to their upper ends miter gears 27 mated with their complements 28 which are axially slidable upon a transverse shaft 29 provided with a spline 30 (FIG. 3) to lock the gears 28 for rotation with the shaft 29 which derives its drive through chain and sprocket gearing 31 from a drive shaft 32 which is shown as driven in turn by a miter gear pair 33 from a power shaft 34 (FIGS. 2 and 3).

The lateral adjustability of the elements p of the transfer unit and the drive means associated therewith, including the miter gears 28, thus obtainable, makes it possible to accommodate these elements to articles of various lateral dimensions, and similar accommodation of the upper and lower pairs of guide rods 2 is effected by their bolt and slot mountings 35 and 36 on the clamping plates 25 and on a platform 37, respectively.

In order that the article engaging members or finger plates 4—5 of the chains 3 of the two transfer elements p may be transversely aligned for proper simultaneous engagement with an article, particularly a carton, to thus transfer the same without lateral misalignment and possible jamming of their feed, the drive shaft 14 is divided by a two-part coupling 38 (FIGS. 4 and 5) to the separate parts of which the adjacent ends of the shaft 14 are keyed, these two separate parts of the coupling, and the respective parts of the shaft keyed thereto being relatively radially adjustable and being secured in adjusted union by the slot and bolt connections 39 (see FIG. 5). Thus, the relative setting of the chains 3 driven by the shafts 14 and 15 may be so adjusted as to bring operation of their respective article engaging members or finger plates into desired synchronism.

As shown particularly in FIGS. 2, 3 and 6 the in-feed and discharge ends of the apparatus are provided, particularly when cartons are the articles handled, with top guides 40 and 41, respectively, the latter of which may serve as the dead plate o, and both of which may preferably be vertically adjustable as by slotted and bolted brackets 42 as indicated in FIGS. 2 and 3.

One of the advantageous features of the transfer unit is that it makes possible relatively gentle handling of articles, particularly cartons, after they leave the conveyor belts h and i, having been moved by these belts onto the dead plate o. This gentle handling is accomplished, primarily, due to the relatively closer spacing of the article engaging members or finger plates 4—5, in regard to the spacing of the lugs of the conveyor belts and to the divergent travel of these article engaging members or finger plates at opposite sides of the mechanism. Hence, the chains 3 which carry the article engaging members or finger plates may have a linear travel slower than that of the conveyor belts h and i and thus the article engaging members or finger plates will be moved into contact with the articles successively and intermittently fed by the belts relatively slowly, and their contact with and movement of the articles over the dead plate o will be gentle, and will, moreover, particularly when freshly glued cartons are being fed, be out of those areas of the cartons adjacent to the end closure flaps where the glue-sealing of the cartons has been effected. Also, due to the angle of travel of the chains 3 at their divergence, not only will the linear speed of transfer travel of the articles be further reduced but the faces 5 of the article engaging members or finger plates will be maintained in laterally-sliding contact with the trailing faces of the articles and thus will have no tendency to mar them while in such contact during their discharge. Furthermore, as the articles are moved by the transfer unit, they will be in contact primarily only with the dead plate o, but guided at their upper ends although only lightly, by the top guide 40.

Obviously, this gentle handling is of particular advantage when the articles being handled are cartons for the reason that the lateral withdrawal of the faces 5 of the article engaging members or finger plates from the trailing sides of the cartons will not only obviate marring but will also avoid crushing of the cartons.

Although in the foregoing the angle of divergence of the chains 3 of the transfer elements and of the finger plates 4 and 5 is specifically suggested at 45°, which has been found in practice to be operatively efficient, particularly in the handling of cartons, this angle may be greater or less than 45° as the nature of the articles and the functional requirements of the mechanism may dictate.

Also, it is possible to vary the linear speed of travel of the chains 3 of the transfer elements by use of miter gear sets 27—28 of different ratios without altering the drive of the conveyor belts h and i of the machine with which the mechanism of the invention is associated.

Various changes and modifications are considered to be within the principle of the invention and the scope of the following claims.

What we claim is:

1. Article handling mechanism, including means defining a guide path for supporting and guiding said articles, article feeding means comprising a travelling conveyor having a working pass arranged for travel longitudinally of and adjacent to said path and provided with article engaging means extending into and traversing said path to thus engage and propel articles therealong to a point of discharge, said article feeding means having a portion of the said working pass paralleling said path and a portion angularly divergent therefrom adjacent to said point of discharge, and said article engaging means having a pair of article engaging faces relatively disposed at an angle preferably equal to such angle of divergence, the divergent portion of said article feeding means providing for a lesser speed of feeding travel of the article engaging means longitudinally of said path as compared to their speed of travel therealong with the portion of said working pass which parallels said path, and the relative angular disposition of the article engaging faces of said article engaging means serving to present one of said faces to the articles during travel of said working pass in parallelism with said path and to present the other of said faces to the articles during the divergent travel of said working pass.

2. Article handling mechanism, including means defining a guide path for supporting and guiding the articles, a pair of similar band-like travelling transfer elements having working passes in laterally spaced relation and flanking said guide path, article engaging finger plates carried by said transfer elements and offstanding from the working passes thereof into said guide path and adapted to engage and propel articles introduced into said guide path and between said working passes longitudinally of the guide path from such point of introduction thereinto to a point of discharge therefrom, said working passes of the transfer elements having portions in relative parallelism and portions relatively angularly divergent adjacent to the point of discharge, said article engaging finger plates having article engaging faces relatively disposed at an angle preferably equal to such angle of divergence for engagement with the articles during travel of said transfer elements in parallelism and divergence, respectively, and means for imparting synchronous linear travel to said transfer elements whereby the finger plates of the two such elements are maintained in operative alignment transversely of the guide path, the divergent portions of the working passes of said transfer elements serving to reduce the speed of travel of the article engaging finger plates longitudinally of said guide path as compared to their speed of travel therealong with the portions of said working passes which are in parallelism.

3. Article handling mechanism as defined in claim 2, in which said finger plates have pairs of article contacting fingers relatively disposed at an angle equal to the angle of divergence of each of said transfer elements, whereby one of said fingers of each said plate will traverse said path normal to the longitudinal axis thereof throughout the parallel portions of the working passes of said transfer elements, and the other of said fingers of each said plate will similarly normally traverse said path throughout the divergent portions of said working passes.

4. Article handling mechanism as defined in claim 2, in which each of said transfer elements comprises a chain and a plurality of sprockets with which said chain travels, the axes of at least two of the sprockets of said plurality having their centers in longitudinally spaced alignment laterally of and parallel to said guide path and serving to support and guide the working pass of the chain parallel to said path, and the axis of a third sprocket of said plurality having its center offset laterally from said guide path and from the longitudinally aligned centers of said two sprockets to thus support and guide a portion of said working pass at a divergent angle from said path, and at least one of said sprockets is a driven sprocket provided with drive means whereby travel will be imparted therethrough to said chain and to the other sprockets of said plurality.

5. Article handling mechanism as defined in claim 4, in which said finger plates are carried by said chains in spaced relation linearly thereof, and said drive means include means for angularly adjusting the driven sprocket of one of said chains, whereby said one chain may be linearly adjusted to insure synchronous travel of the finger plates of the two chains in alignment traneversely of said guide path.

6. Article handling mechanism as defined in claim 4, in which shafts form the axes of the sprockets of the chain of each transfer element and these shafts are axially located by a base plate, and means are provided for supporting said base plates for adjustment laterally of said guide path, whereby said transfer elements may be laterally adjusted with respect to the longitudinal axis of said guide path to thereby accommodate the mechanism to articles of various lateral dimensions.

7. Article handling mechanism as defined in claim 6, in which the shafts of said driven sprockets have driving connections with a common drive shaft, and said driving connections include means adjustable to accommodate the relative lateral adjustment of said transfer elements.

8. Article handling mechanism as defined in claim 6, in which the shafts of said driven sprockets have driving connections with a common drive shaft disposed transversely of said guide path, said driving connections comprising a separate gear set for each said driven sprocket shaft including a gear fixed to each said driven sprocket shaft and a gear keyed to and axially adjustable on said common drive shaft.

9. Article handling mechanism as defined in claim 7, in which the shaft of one of said driven sprockets is divided into two parts intermediate its length and its two parts are connected by a two-part coupling the parts of which are provided with means for securing them and their connected parts of the sprocket shaft in fixed angular adjustment, whereby the chain driven by said one sprocket may be linearly adjusted to insure travel of its finger plates in synchronism with the finger plates of the other chain.

10. Article handling mechanism as defined in claim 4, in which the axes of the divergently arranged sprockets are provided with means whereby they may be linearly adjusted with respect to the axes of the other sprockets to maintain appropriate tension on said chains.

11. Article handling mechanism as defined in claim 6, in which the shafts of the divergently arranged sprockets are carried by slides provided with means for their fixed adjustment on the respective base plates, whereby the tension of said chains may be adjusted.

References Cited in the file of this patent
UNITED STATES PATENTS 2,805,755    Jones _____ Sept. 10, 1957